United States Patent
Belwafa (10) Patent No.: US 9,650,011 B1
(45) Date of Patent: May 16, 2017

(54) PASSENGER AIRBAG INCLUDING DEPLOYABLE EXTENSIONS

(71) Applicant: Ford Global Technologies, LLC, Dearborn, MI (US)

(72) Inventor: Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/146,091

(22) Filed: May 4, 2016

(51) Int. Cl.
| | |
|---|---|
| *B60R 21/233* | (2006.01) |
| *B60R 21/205* | (2011.01) |
| *B60R 21/2338* | (2011.01) |
| *B60R 21/239* | (2006.01) |
| *B60R 21/01* | (2006.01) |
| *B60R 21/017* | (2006.01) |
| *B60R 21/231* | (2011.01) |

(52) U.S. Cl.
CPC .......... *B60R 21/233* (2013.01); *B60R 21/01* (2013.01); *B60R 21/017* (2013.01); *B60R 21/205* (2013.01); *B60R 21/239* (2013.01); *B60R 21/2338* (2013.01); *B60R 2021/2395* (2013.01); *B60R 2021/23161* (2013.01); *B60R 2021/23308* (2013.01); *B60R 2021/23382* (2013.01)

(58) Field of Classification Search
CPC .............. B60R 21/233; B60R 21/2338; B60R 2021/23161; B60R 2021/23382; B60R 21/205
See application file for complete search history.

(56) References Cited

U.S. PATENT DOCUMENTS

| | | | |
|---|---|---|---|
| 5,609,363 A | 3/1997 | Finelli | |
| 6,511,093 B2 | 1/2003 | Buerkle et al. | |
| 6,962,363 B2 | 11/2005 | Wang et al. | |
| 7,540,534 B2 | 6/2009 | Hasebe et al. | |
| 7,661,700 B2 | 2/2010 | Imamura et al. | |
| 7,690,683 B2 | 4/2010 | Parks et al. | |
| 7,798,520 B2 | 9/2010 | Feller et al. | |
| 7,942,443 B2 | 5/2011 | Dennis et al. | |
| 7,992,897 B2 | 8/2011 | Sekino et al. | |
| 8,096,578 B2 | 1/2012 | Wigger et al. | |
| 8,272,667 B2 | 9/2012 | Schneider et al. | |
| 8,292,323 B2 | 10/2012 | Matsushima et al. | |
| 8,632,094 B2 | 1/2014 | Schmidt et al. | |
| 8,636,301 B1 | 1/2014 | Wang et al. | |
| 8,757,658 B2 * | 6/2014 | Feinstein | B60R 21/203 280/731 |

(Continued)

FOREIGN PATENT DOCUMENTS

| | | |
|---|---|---|
| DE | 10311006 B4 | 10/2009 |
| GB | 2340458 A | 2/2000 |

(Continued)

*Primary Examiner* — Faye M Fleming
(74) *Attorney, Agent, or Firm* — Frank A. MacKenzie; Bejin Bieneman PLC (57) ABSTRACT

A restraint system includes an instrument panel and an airbag inflatable from the instrument panel to an inflated position. The airbag includes a main portion and an extension selectively extendable from the main portion in the inflated position. The main portion has a front panel spaced from the instrument panel in the inflated position. The extension is fixed to the front panel and has an inflation chamber defined by at least the front panel.

23 Claims, 10 Drawing Sheets

(56) References Cited

U.S. PATENT DOCUMENTS

| | | | |
|---|---|---|---|
| 9,205,798 B1 | 12/2015 | Jindal et al. | |
| 2002/0113416 A1* | 8/2002 | Uchida | B60R 21/233 |
| | | | 280/729 |
| 2003/0094794 A1* | 5/2003 | Amamori | B60R 21/231 |
| | | | 280/729 |
| 2006/0131847 A1 | 6/2006 | Sato et al. | |
| 2006/0237953 A1 | 10/2006 | Abe | |
| 2007/0018477 A1* | 1/2007 | Takabata | B60J 3/0208 |
| | | | 296/97.8 |
| 2013/0001934 A1* | 1/2013 | Nagasawa | B60R 21/233 |
| | | | 280/731 |
| 2014/0239617 A1* | 8/2014 | Dix | B60R 21/233 |
| | | | 280/728.2 |
| 2015/0258958 A1 | 9/2015 | Belwafa et al. | |
| 2016/0159311 A1* | 6/2016 | Yamada | B60R 21/233 |
| | | | 280/729 |

FOREIGN PATENT DOCUMENTS

| | | |
|---|---|---|
| JP | H10138860 A | 5/1998 |
| JP | 200844480 A | 2/2008 |
| JP | 2008189023 | 8/2008 |
| JP | 5012725 B2 | 8/2012 |
| JP | 5026098 B2 | 9/2012 |
| JP | 5212555 B2 | 6/2013 |
| JP | 2016016730 A | 2/2016 |
| WO | 2008006350 A2 | 1/2008 |

* cited by examiner

PASSENGER AIRBAG INCLUDING DEPLOYABLE EXTENSIONS

BACKGROUND

A vehicle may be equipped with an airbag in the steering wheel for the occupant in the driver seat and an airbag in the instrument panel for an occupant in the front passenger seat. During an oblique frontal impact, there is a risk that a head or upper body of the occupant of the front passenger seat may travel between the driver and passenger airbags or toward a passenger door or an A-pillar, reducing the protection provided by the passenger airbag. Even during a head-on frontal impact, there is a potential that the momentum of the head or upper body of an occupant may cause the head or upper body to slide off the passenger airbag in between the airbags toward the instrument panel or toward the door or A-pillar. Furthermore, the momentum of the head of the occupant may cause the head to twist when contacting the driver or passenger airbag, which may result in neck strain.

DETAILED DESCRIPTION

With reference to the Figures, wherein like numerals indicate like parts throughout the several views, a restraint system 30 for a vehicle 44 includes an instrument panel 32 and a passenger airbag 34 inflatable from the instrument panel 32 to an inflated position. The passenger airbag 34 includes a main portion 36 and an extension 38 extending from the main portion 36 in the inflated position. The main portion 36 has a front panel 40 spaced from the instrument panel 32 in the inflated position. The extension 38 is fixed to the front panel 40 and has an inflation chamber 42 defined by at least the front panel 40.

The addition of the extension 38 may help prevent an upper body of an occupant from traveling to the left of the main portion 36 of the passenger airbag 34, which may thus position the occupant in a position to reduce the likelihood and severity of injury to the occupant during a vehicle impact. Furthermore, the extension 38 may help keep a head of the occupant facing forward rather than twisting when contacting the main portion 36.

Figure 1:
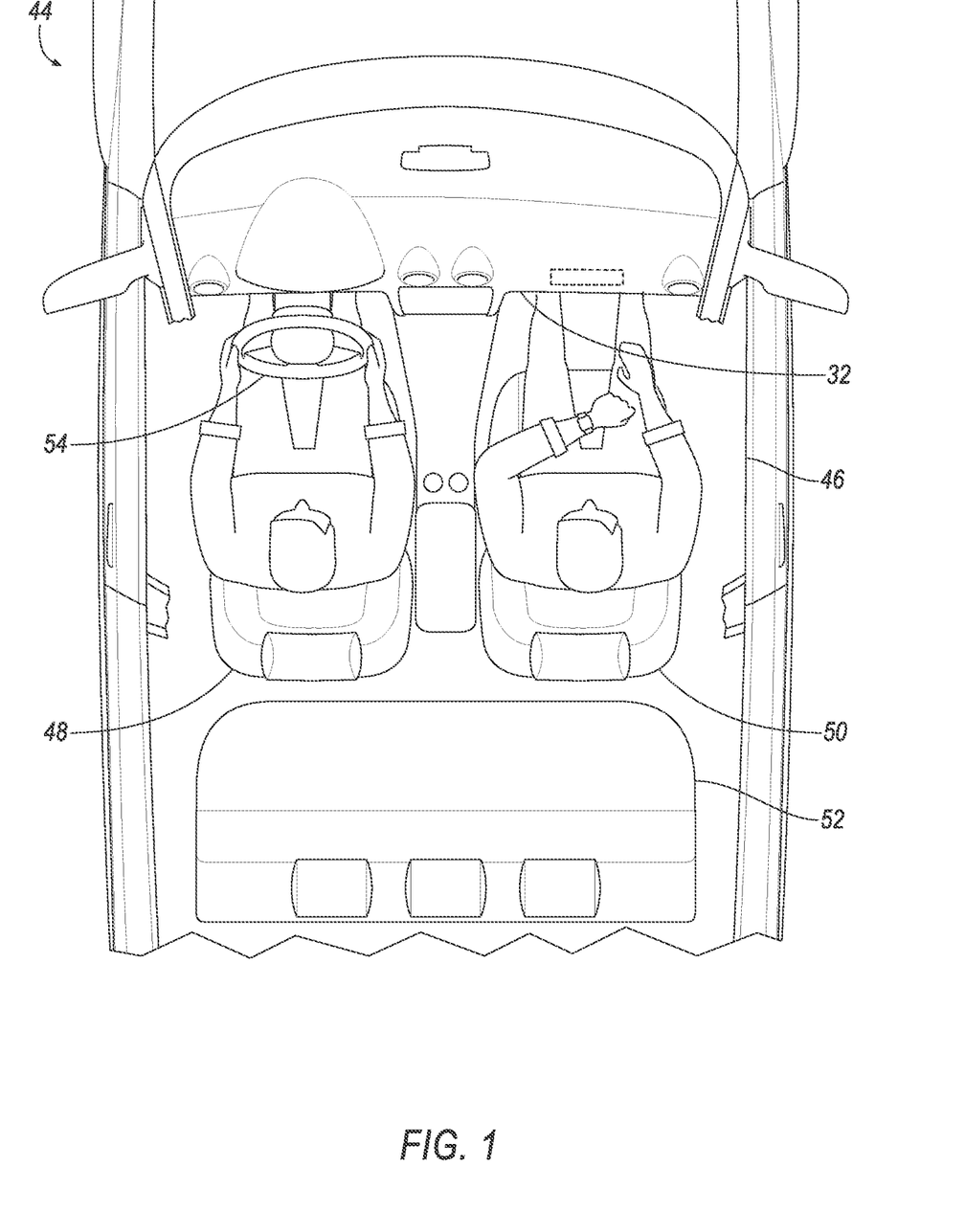
FIG. 1 is a top view of a vehicle with a passenger cabin revealed.

With reference to FIG. 1, the restraint system 30 may be implemented in the vehicle 44, specifically in a passenger cabin 46 located inside the vehicle 44. The passenger cabin 46 houses any occupants of the vehicle 44, who sit in the seats 48, 50, 52, which may include a driver seat 48, a passenger seat 50, and a rear seat 52. The seats 48, 50, 52 may face in a vehicle-forward direction toward the instrument panel 32.

Figure 2:
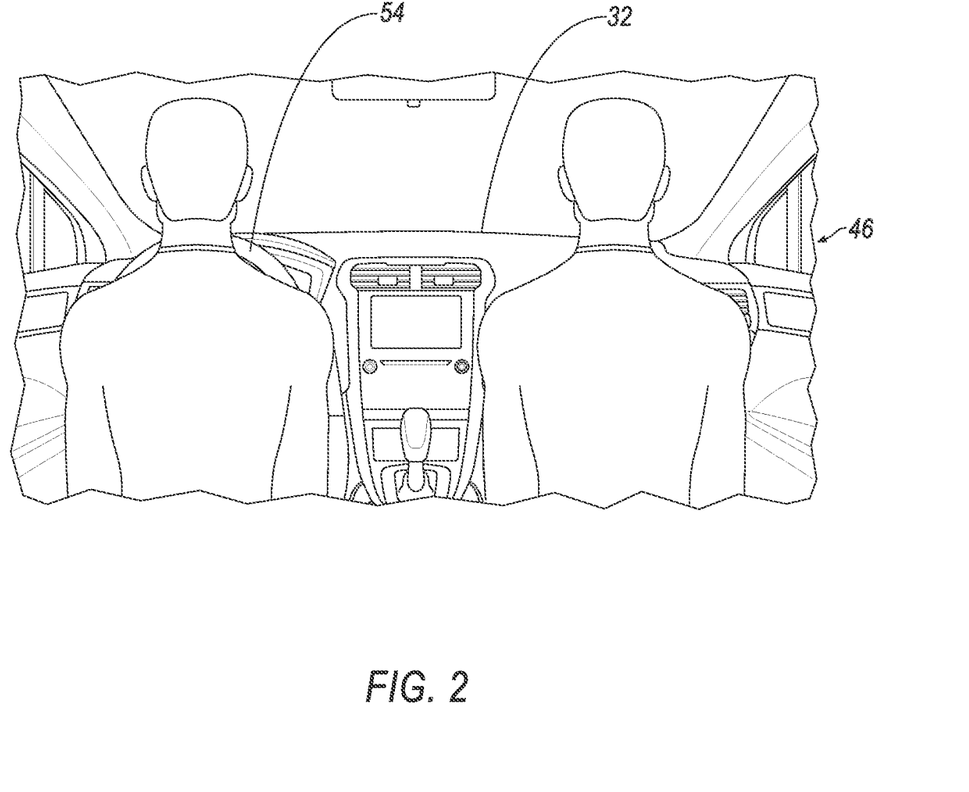
FIG. 2 is a rear view of a portion of the passenger cabin including an instrument panel of the vehicle.

With reference to FIG. 2, the instrument panel 32 may be disposed at a forward end of the passenger cabin 46. The instrument panel 32 may include vehicle controls, including a steering wheel 54. A driver airbag 96 may be supported on the steering wheel 54. The passenger airbag 34, in an uninflated position, is disposed in the instrument panel 32. The steering wheel 54 is spaced from the passenger airbag 34.

Figure 3A:
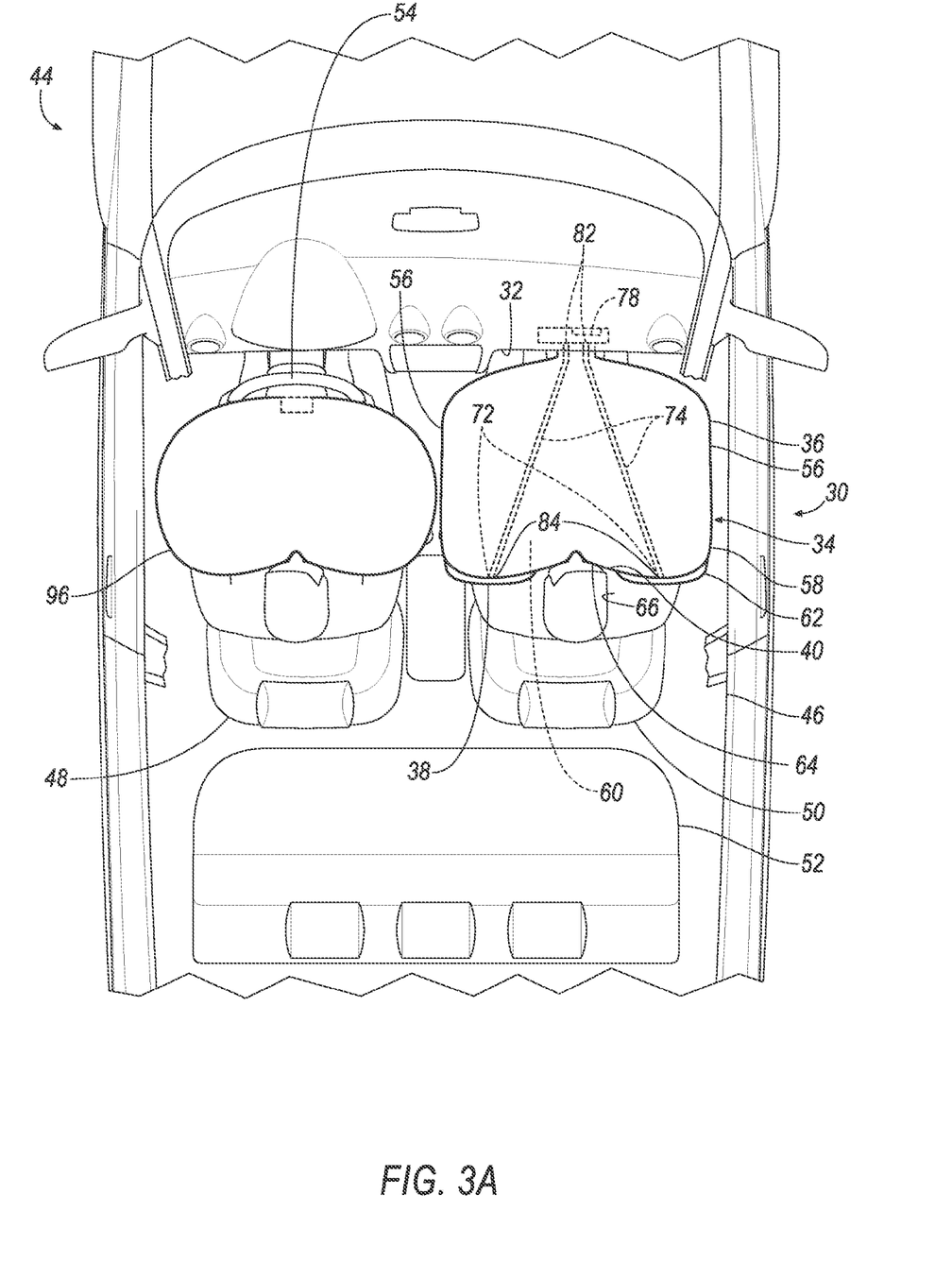
FIGS. 3A-C are top views of the passenger cabin of FIG. 1 with a driver airbag and a passenger airbag in an inflated position.
Figure 3B:
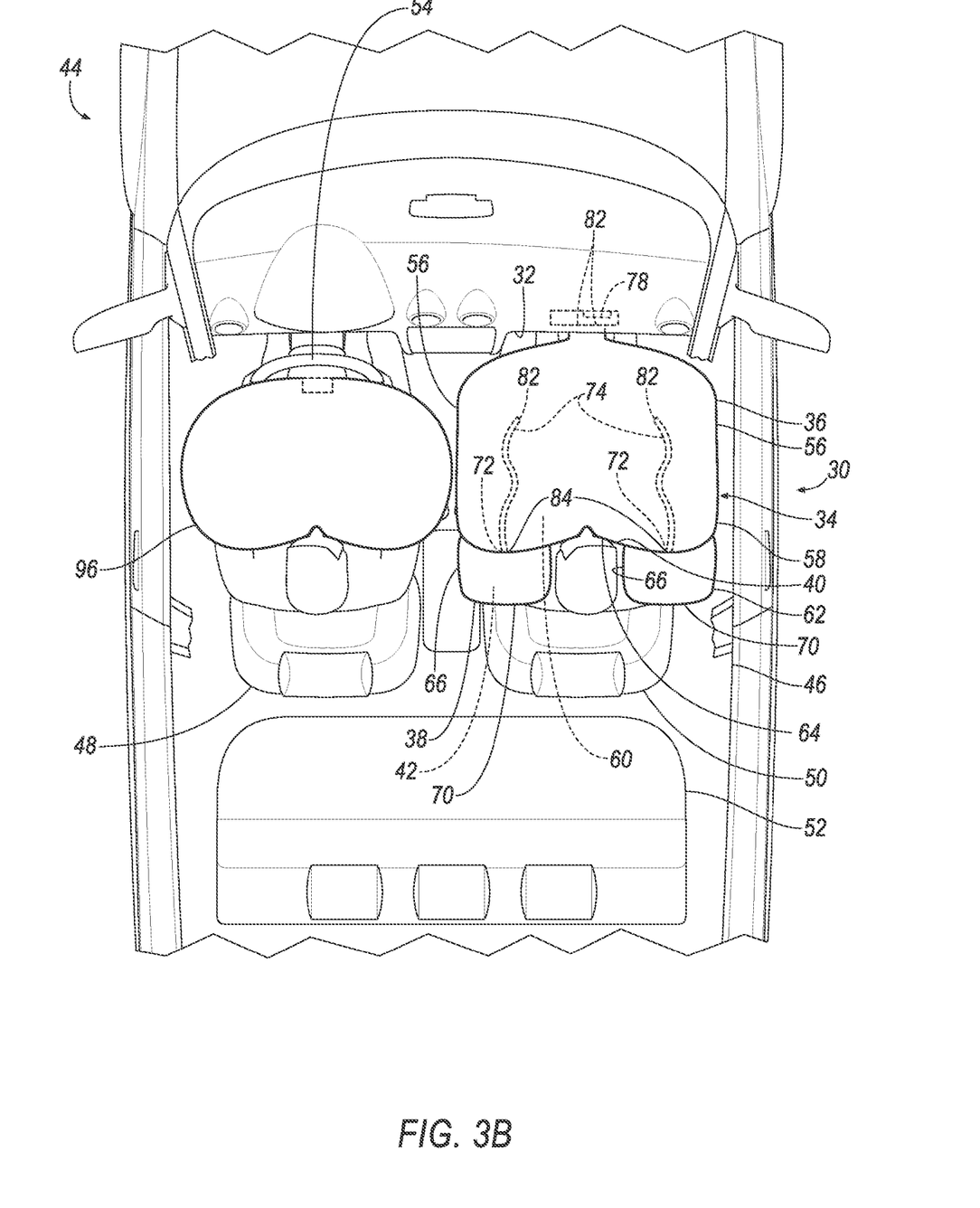
Figure 3C:
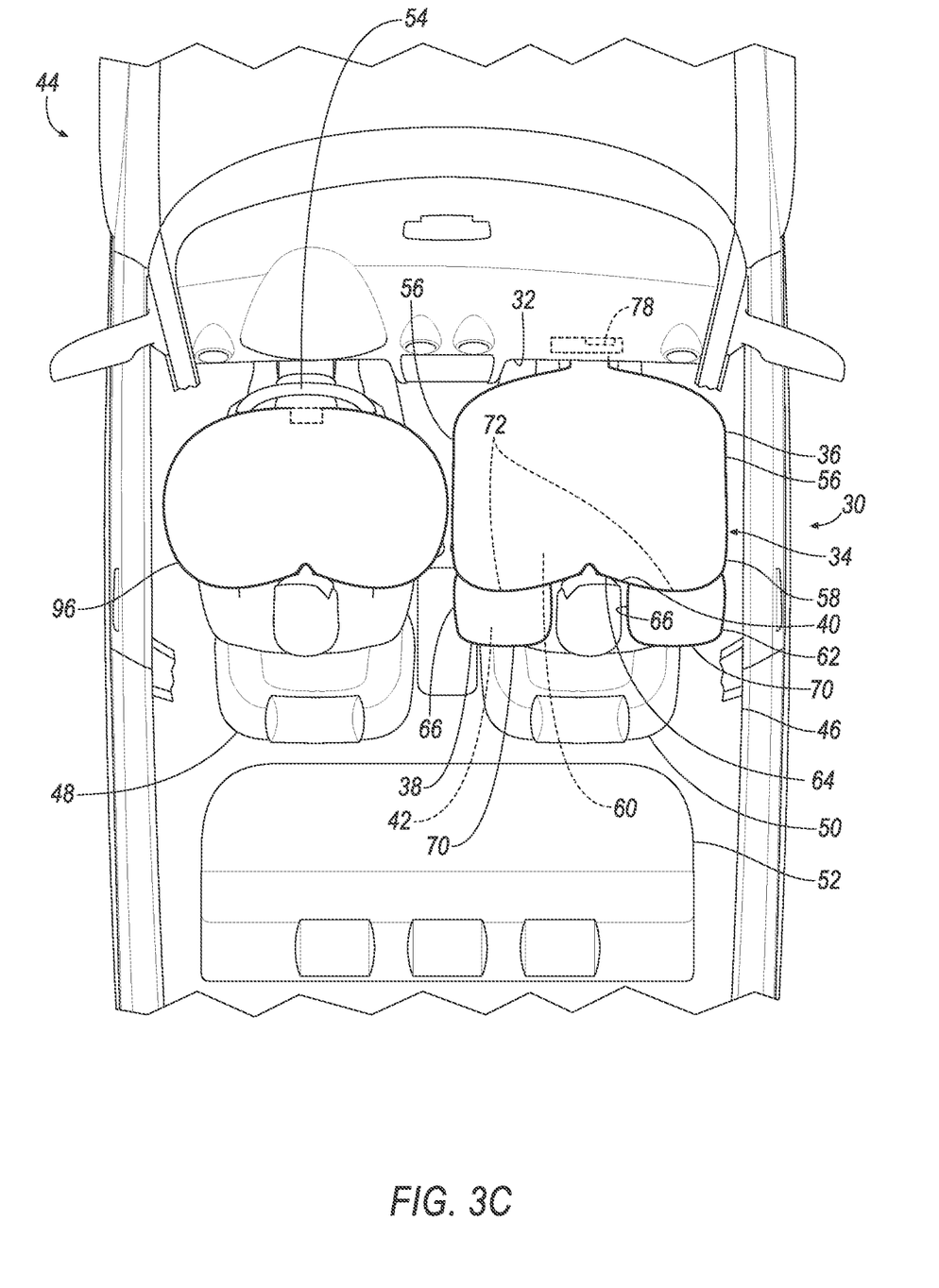
Figure 4:
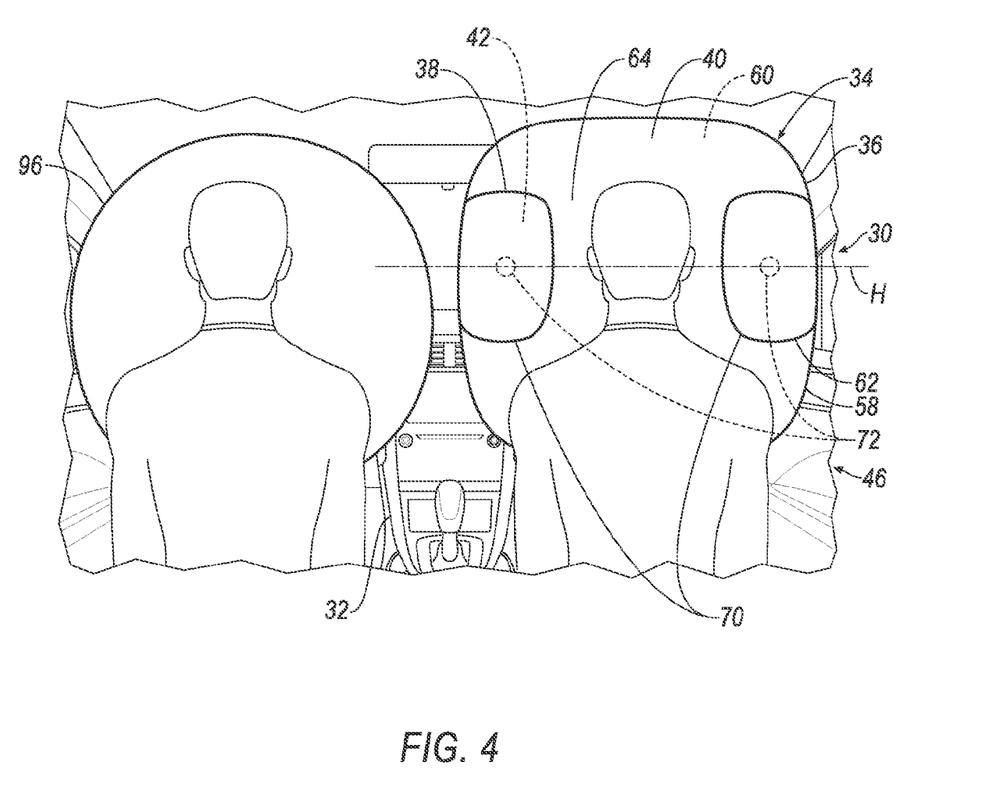
FIG. 4 is the rear view of the passenger cabin of FIG. 1 with the driver airbag and the passenger airbag in the inflated position.

With reference to FIGS. 3A-5, the passenger airbag 34 may be disposed in a vehicle-forward direction from the passenger seat 50. The passenger airbag 34 is inflatable from the instrument panel 32 from an uninflated position, as shown in FIGS. 1-2, to the inflated position, as shown in FIGS. 3A-4. The passenger airbag 34 may be disposed in the instrument panel 32 in the uninflated position and may extend from the instrument panel 32 in the inflated position. The passenger airbag 34 has the main portion 36 and the extension 38 extend from the main portion 36 in the inflated position.

The passenger airbag 34 may be formed of any suitable airbag material, for example, a woven polymer. For example, the passenger airbag 34 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIGS. 3A-C, an inflator 78 may be in communication with the passenger airbag 34. Upon receiving a signal from, e.g., a controller 80, the inflator 78 may inflate the passenger airbag 34 with an inflatable medium, such as a gas. The inflator 78 may be, for example, a pyrotechnic inflator that uses a chemical reaction to drive inflation medium to the airbag 34. The inflator 78 may be of any suitable type, for example, a cold-gas inflator.

The main portion 36 of the passenger airbag 34 extends from the instrument panel 32 in a vehicle-rearward direction in the inflated position. The main portion 36 has the front panel 40 spaced from the instrument panel 32 in the inflated position and one or more side panels 56 extending from the front panel 40 toward the instrument panel 32 in the inflated position. The side panel 56 may extend about a perimeter 58 of the front panel 40.

The main portion 36 defines an inflation chamber 60, which is in communication with the inflation chamber 42 of the extension 38 through the front panel 40. The front panel 40 and side panel 56 may define the inflation chamber 60 of the main portion 36.

The extension 38 is fixed to the front panel 40. The extension 38 may extend from the main portion 36 of the passenger airbag 34 in the vehicle-rearward direction in the inflated position. As one example, the extension 38 may extend from the front panel 40 and the side panel 56 of the main portion 36 in the inflated position. In other words, the extension 38 may be disposed on the perimeter 58 of the front panel 40. Alternatively, the extension 38 may be spaced from the perimeter 58. The extension 38 may be disposed between the front panel 40 and the steering wheel 54.

A second extension 62 may be fixed to the front panel 40 and spaced from the extension 38. The second extension 62 may extend from the main portion 36 of the passenger airbag 34 in the vehicle-rearward direction in the inflated position. As one example, the second extension 62 may extend from the front panel 40 and the side panel 56 of the main portion 36 in the inflated position. In other words, the second extension 62 may be disposed on the perimeter 58 of the front panel 40. Alternatively, the second extension 62 may be spaced from the perimeter 58. The second extension 62 may be disposed between the front panel 40 and a right A-pillar (not numbered) of the vehicle 44.

Figure 5:
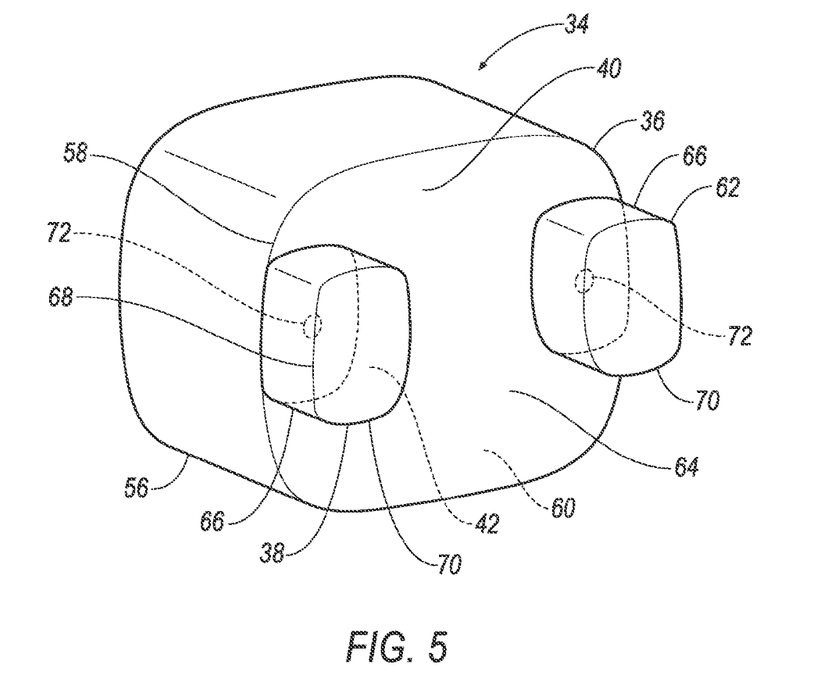
FIG. 5 is a perspective view of the passenger airbag in the inflated position with extensions in an extended position
Figure 6:
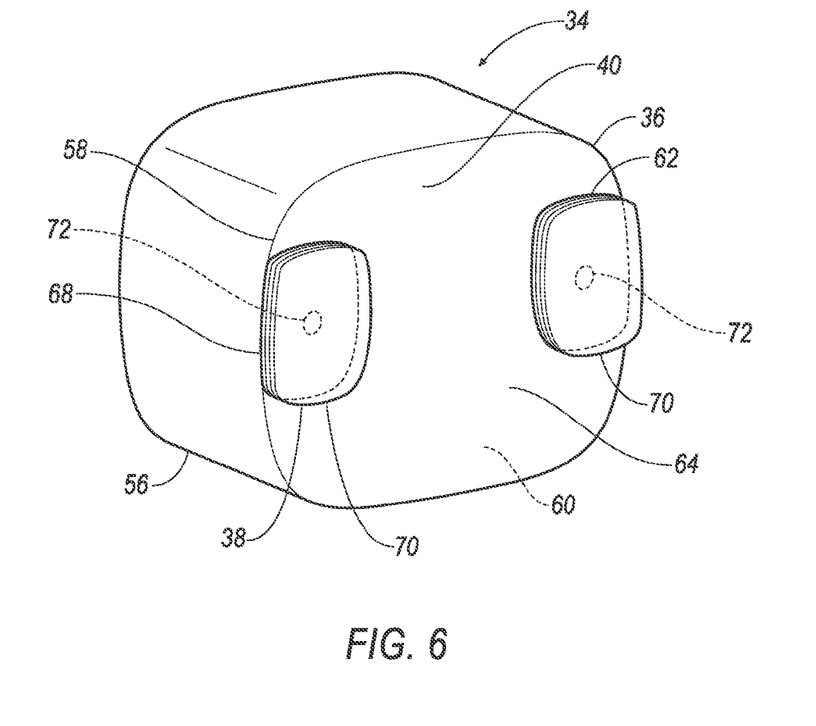
FIG. 6 is a perspective view of the passenger airbag in the inflated position with the extensions in a retracted position.

The extensions 38, 62 may be selectively, and independently, moveable extendable relative to the front panel 40. Specifically, the extensions 38, 62 may be extendable from a retracted position, as shown in FIGS. 3A and 6, to an extended position, as shown in FIGS. 3B-5. The extensions 38, 62 may extend from the retracted position to the extended position during or after inflation of the inflation chamber 60 of the main portion 36.

As set forth above, the extensions 38, 62 may be selectively and independently extendable. In other words, when the inflation chamber 60 of the main portion 36 is inflated, both extensions 38, 62 may be retained in the retracted position, one of the extensions 38, 62 may retained in the retracted position and the other one of the extensions 38, 62 may be extended to the extended position, or both of the extensions 38, 62 may be extended to the extended position. As set forth below, the decision to extend or not extend the extensions 38, 62 may be based on a direction of a vehicle impact.

In the extended positions, the extensions 38, 62 may have rectangular cross-sections as shown in FIG. 4 or may have any other suitable cross-sectional shape, such as oval or diamond. The depth of the extensions 38, 62 along the perimeter 58 may be constant as shown in FIGS. 3B-C or may vary. Each extension 38, 62 may be integral and/or may include multiple extensions.

With reference to FIG. 4, the extension 38 and the second extension 62 may be aligned along a horizontal axis H. The front panel 40 may define an impact surface 64 extending between the extension 38 and the second extension 62 in the inflated position, and the impact surface 64 may be sized to receive a head of a vehicle occupant. In other words, the extensions 38, 62 may be laterally spaced when the passenger airbag 34 is in the inflated position to permit the head of the occupant between the extensions 38, 62.

The extensions 38, 62 each have a perimeter panel 66 fixed to the front panel 40 of the main portion 36 of the passenger airbag 34. The perimeter panel 66 may be attached to the front panel 40 in any suitable fashion, for example, stitching. Alternatively, the perimeter panel 66 may be integral with the main front panel 40, that is, formed together simultaneously as a single, continuous unit.

The perimeter panel 66 extends about a perimeter of the extension 38 and may be fixed to the main portion 36 along the perimeter of the extension 38. A portion of the perimeter panel 66 of the extension 38 may extend from the side panel 56 of the main portion 36, and in this configuration, a remaining portion of the perimeter panel 66 may extend from the front panel 40 of the main portion 36. The perimeter panel 66 may extend generally perpendicularly from the front panel 40 of the main portion 36.

The extensions 38, 62 may each include a front panel 70 spaced from the front panel 40 of the main chamber in the inflated position. The front panel 70 may be formed separately the perimeter panel 66 and subsequently attached to the perimeter panel 66, for example, by stitching. Alternatively, the front panel 70 may be integral with the perimeter panel 66, that is, formed together simultaneously as a single, continuous unit.

With reference to FIG. 5, the extension 38 and second extension 62 each have the inflation chamber 42 defined by at least the front panel 40 of the main portion 36 of the passenger airbag 34. Specifically, the inflation chamber 42 may be further defined by the front panel 40, the perimeter panel 66, and the front panel 70. It should be appreciated that the adjective "second" is used herein merely as an identifier, and does not indicate order or importance.

The inflation chamber 60 of the main portion 36 may be in communication with the inflation chamber 42 of the extensions 38, 62 through the front panel 40. Specifically, the inflation chamber 60 of the main portion 36 may be in communication with the inflation chamber 42 of the extension 38, 62 through a vent 72. The vent 72 connecting the main portion 36 and the extension 38 may be an open vent, a one-way vent, or a two-way vent, as shown in FIG. 3C, or an active vent, as shown in FIGS. 3A-B. The inflation chamber 42 of each extension 38, 62 may be in communication with the inflation chamber 60 of the main portion 36 through a single vent 72 or multiple vents 72.

Figure 7A:
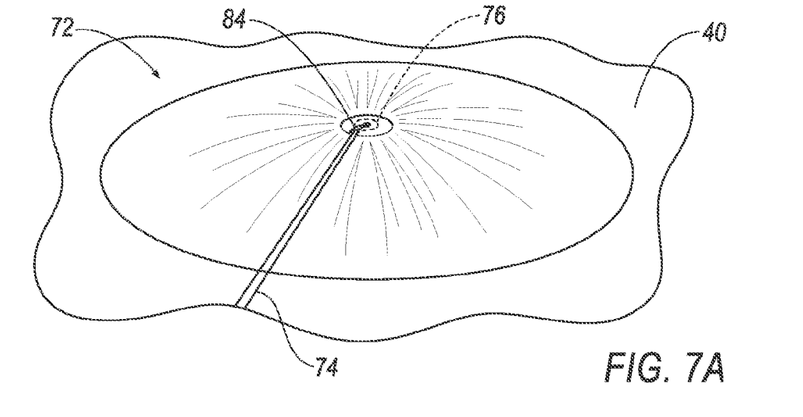
FIG. 7A is a perspective view of an active vent of the passenger airbag including a tether holding the active vent in a closed position.
Figure 7B:
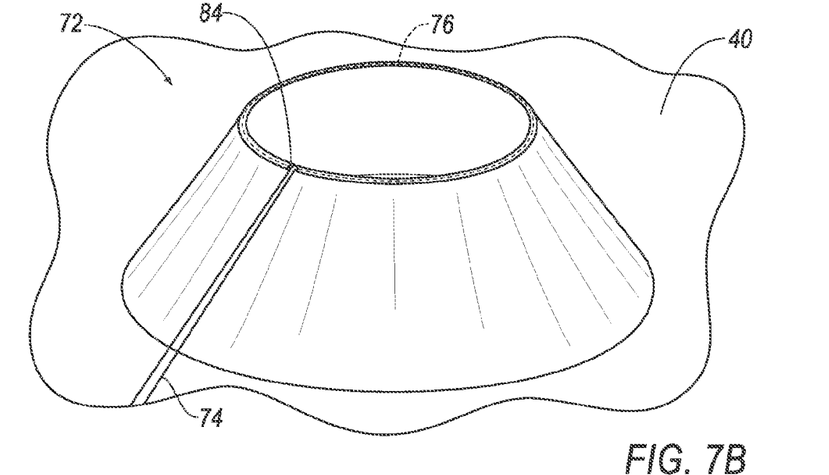
FIG. 7B is a perspective view of the active vent in an open position.

For example, the vent 72 shown in FIGS. 7A-B is an active vent 72 connecting the main portion 36 and the extension 38, 62. A tether 74 may selectively couple the active vent the instrument panel 32, and may be releasable to open the active vent 72 to inflate the inflation chamber 42. For example, the tether 74 may include a loop 76 that is threaded around the vent 72. If the tether 74 is taut, then the loop 76 holds the vent 72 closed, as shown in FIG. 7A. If the tether 74 is released, then the vent 72 opens, as shown in FIG. 7B.

The tether 74 may be coupled to the instrument panel 32 and attached to the extension 38, 62 or to the vent 72. The tether 74 has a first end 82 and a second end 84. The first end 82 of the tether 74 may be coupled to the instrument panel 32, either directly or indirectly via a canister (not shown), etc. The second end 84 of the tether 74 may cinch the active vent 72. Alternatively, the second end 84 of the tether 74 may be attached to the extension 38.

The tether 74 may have the form of a strap. The tether 74 may be formed of fabric, may be formed of the same material as the passenger airbag 34, or may be formed of any other suitable material.

The tether 74 may be designed to break when a pressure in the inflation chamber 60 of the main portion 36 exceeds a pressure threshold. As one example, the tether 74 may have a weak point 86 (not shown), which may break when the inflator 78 inflates the inflation chamber 60 above the pressure threshold, which applies tension to the tether 74. In this configuration, the inflator 78 may be designed to operate in at least two phases, for example, may be a dual-phase inflator, and may output different amounts of inflation medium in each phase. The controller 80 may be programmed to operate the inflator 78 in any one of the phases in response to conditions of the vehicle impact, as set forth further below.

Figure 8:
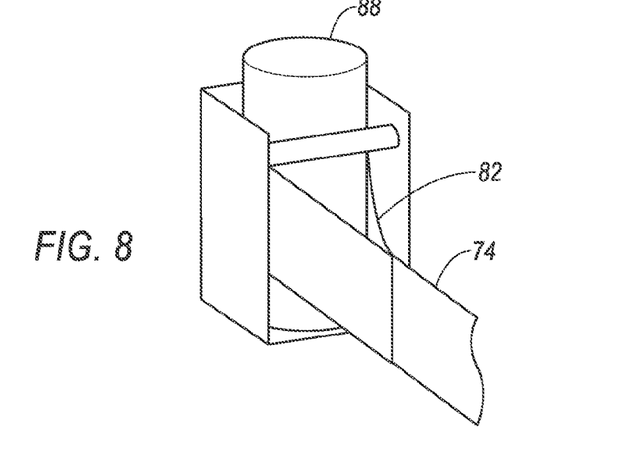
FIG. 8 is a perspective view of a release pin connected to the tether.

Alternatively, with reference to FIG. 8, release pins 88 may couple the tethers 74 of each extension 38, 62 to the instrument panel 32, either directly or indirectly via a canister (not shown), etc. The first end 82 of the tether 74 may loop around or be attached to the release pin 88. The release pin 88 may be detached from the tether 74, by any suitable mechanism, to release the tether 74 and allow the extension 38, 62 to move to the extended position. For example, a pyrotechnic discharge may fire the release pin 88 away from the first end 82 of the tether 74. Alternatively, the release pin 88 may include a cutter (not shown) that cuts the tether 74 when the release pin 88 is discharged.

Figure 9:
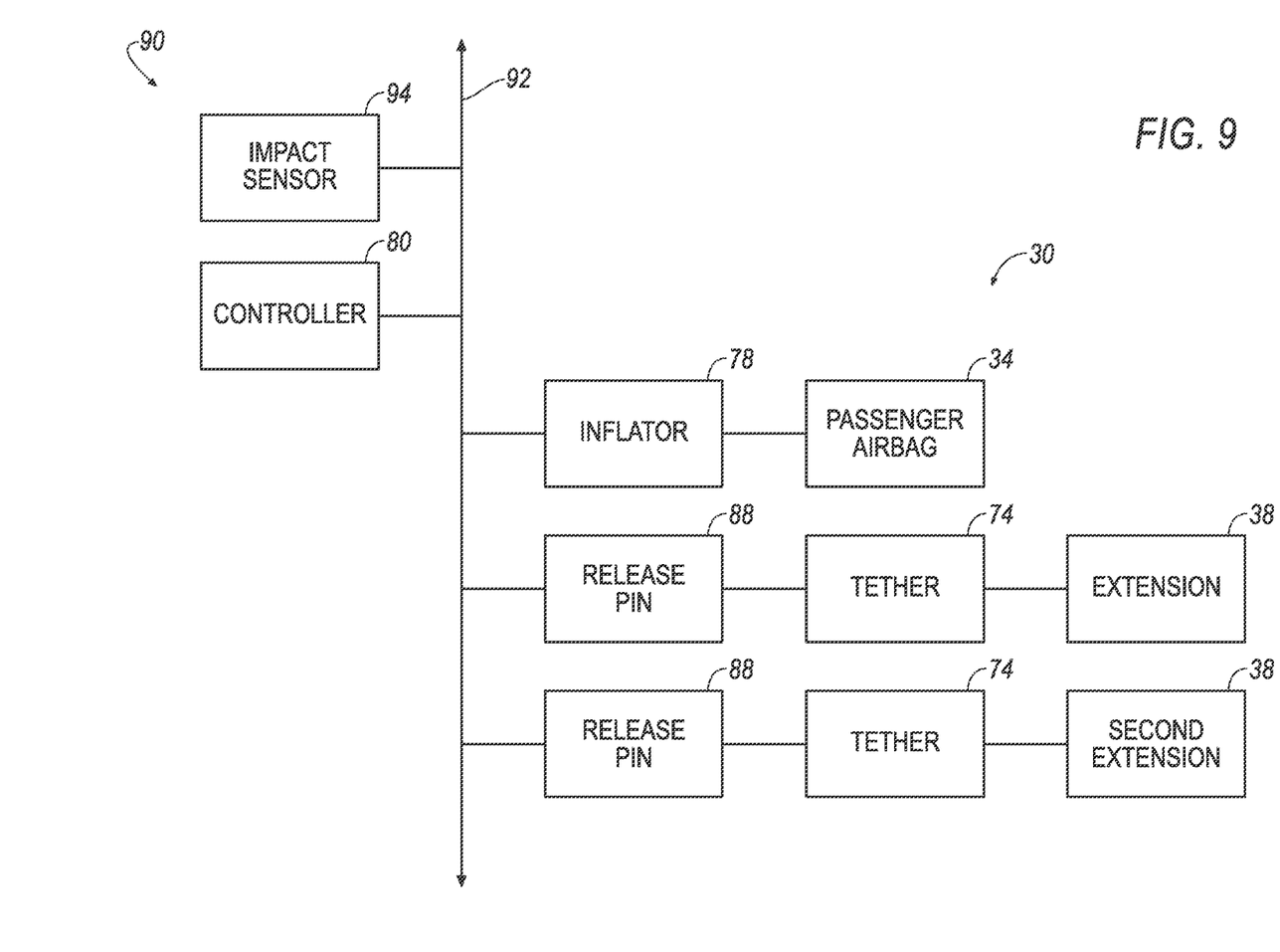
FIG. 9 is a block diagram of a control system.

With reference to FIG. 9, a control system 90 may include the controller 80 in communication with the inflator 78 and an impact sensor 94. The controller 80, the inflator 78, and the impact sensor 94 communicate through a communications network 92. As shown in FIG. 9, the release pin 88 may be in communication with the controller 80 through the communications network 92.

The controller 80 may be a microprocessor-based controller. The controller 80 may include a processor, memory, etc. The memory of the controller 80 may store instructions executable by the processor.

The impact sensor 94 may be in communication with the controller 80. The impact sensor 94 detects an impact to the vehicle 44. The sensor 94 may be of any suitable type, for example, post-contact sensors such as accelerometers, pressure sensors, and contact switches; and pre-impact sensors such as radar, lidar, or vision-sensing systems. The vision systems may include one or more cameras, CCD image sensors, CMOS image sensors, etc. The sensor 94 may be located at numerous points in or on the vehicle 44.

The control system 90 may transmit signals through a communications network 92, such as a controller area network (CAN) bus, Ethernet, and/or by any other wired or wireless communications network.

The controller 80 may be programmed to instruct the inflator 78 to inflate the inflation chamber 60 a selected pressure based on a sensed direction of vehicle impact, e.g., to operate the inflator 78 in a selected mode. For example, if the extension 38 is disposed on the left side of the front panel 40 relative to an occupant and the impact sensor 94 detects an impact from the front and left of the vehicle 44, or the front and right of the vehicle 44, then the controller 80 may be programmed to inflate the passenger airbag 34 at a relatively higher pressure that exceeds the pressure threshold of the tether 74 to release the extensions 38, 62 to the extended position. If the impact sensor 94 detects an impact from a direction for which it is not desirable to release the extensions 38, 62 to the extended position, e.g. a head-on impact, then the controller 80 may be programmed to inflate the passenger airbag 34 at a relatively lower pressure that is less than the pressure threshold of the tether 74 to retain the extensions 38, 62 in the retracted position.

Alternatively, the controller 80 may be programmed to selectively release the release pin 88 based on a sensed direction of impact. For example, if the impact sensor 94 detects an impact from the front and left of the vehicle 44 relative to the occupant, then the controller 80 may be programmed to release the release pin 88 associated with the extension 38 to release the extension 38 to the extended position. In this scenario, the controller 80 may be programmed to retain the release pin 88 associated with the extension 62 to retain the extension 62 in the retracted position. If the impact sensor 94 detects an impact from the front and right of the vehicle 44 relative to the occupant, then the controller 80 may be programmed to release the release pin 88 associated with the extension 62 to release the extension 38 to the extended position. In this scenario, the controller 80 may be programmed to retain the release pin 88 associated with the extension 38 to retain the extension 38 in the retracted position.

Figure 10:
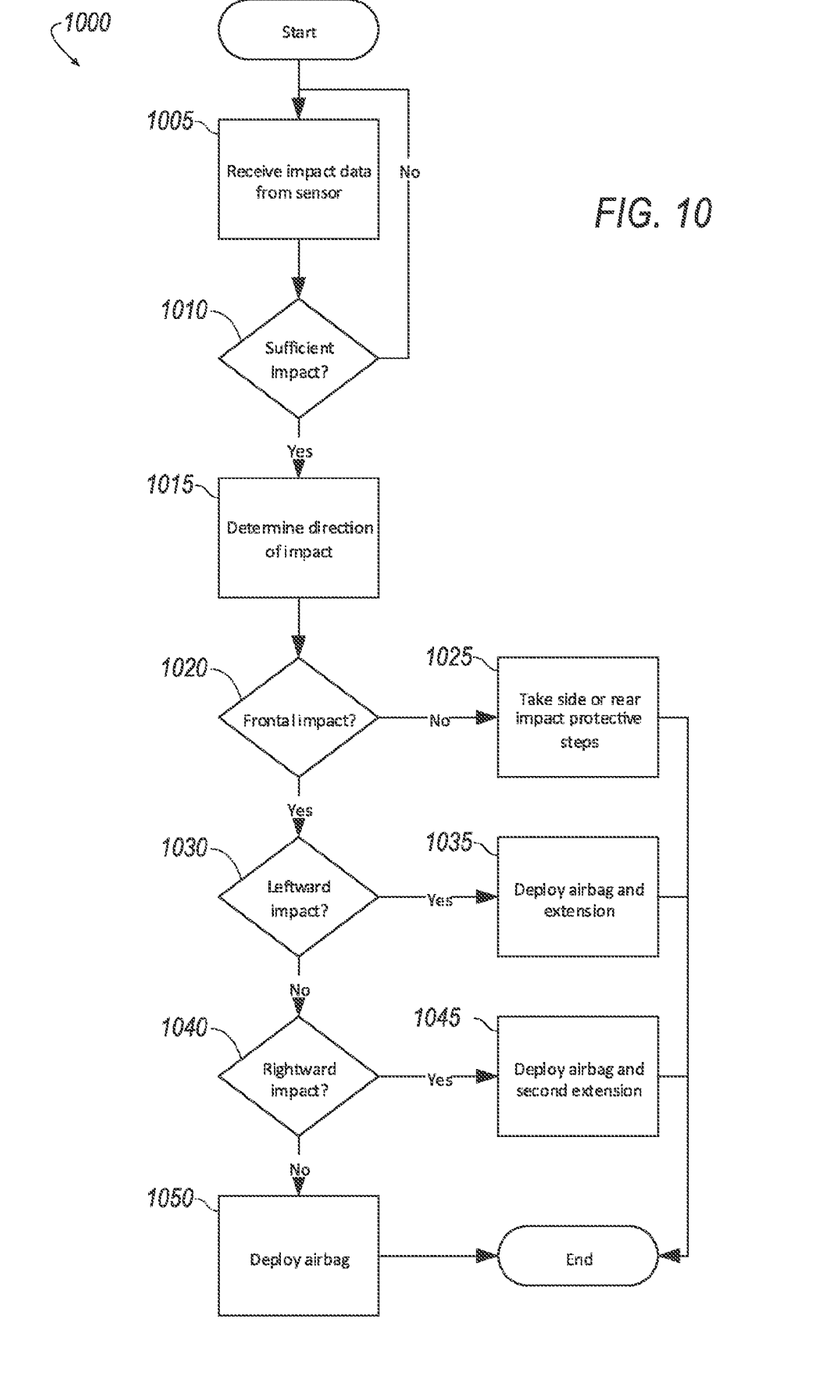
FIG. 10 is a process flowchart.

FIG. 10 is a process flowchart of a process 1000 of deploying the passenger airbag 34 employed by the controller 80 in the event of an impact. If an impact occurs, the impact sensor 94 may detect the impact. The process 1000 begins in a block 1005 with the controller 80 receiving impact data from the impact sensor 94.

In a decision block 1010, the controller 80 evaluates the impact data to determine whether the impact is sufficient to inflate the passenger airbag 34. If the impact is not sufficient, then the controller 80 waits to receive impact data from the impact sensor 94.

If the impact is sufficient to inflate the passenger airbag 34, then the process 900 proceeds to a block 1015, in which the controller 80 evaluates the impact data to determine a direction of the vehicle impact.

Next, in a decision block 1020, the controller 80 determines whether the impact is a frontal impact. If the impact is not a frontal impact, then the controller 80 takes actions in a block 1025 against, for example, a side or a rear impact by, for example, deploying side curtain airbags (not shown).

If the controller 80 determines that the impact is a frontal impact, then in a decision block 1030, the controller 80 determines whether the impact is an impact that will move the occupant forward and to the left, for example, a left oblique impact, that is, the impact occurred from the front-left direction of the vehicle 44 relative to an occupant. If the impact is an impact that will move the occupant forward and to the left, then in a block 1035 the controller 80 deploys the main portion 36 and the extension 38. The controller 80 instructs the inflator 78 to inflate the passenger airbag 34. In the example configuration where the extensions 38, 62 are retained by tethers 74 coupled to release pins 88, the controller 80 instructs the release pin 88 coupling the tether 74 associated with the extension 38 to release. In this instance, the controller 80 may not instruct the release pin 88 coupling the tether 74 associated with the second extension 62 to release. The main portion 36 and the extension 38 inflate and may provide cushioning to the occupant and may prevent the occupant from sliding off of the main portion 36 and impacting the instrument panel 32.

If the impact is not a left oblique impact, then the controller 80 in a decision block 1040 determines whether the impact is an impact that will move the occupant forward and to the right, for example, a right oblique impact, that is, the impact occurred from the front-right direction of the vehicle 44 relative to the occupant. If the impact is an impact that will move the occupant forward and to the right, then in a block 1045 the controller 80 deploys the main portion 36 and the second extension 62. The controller 80 instructs the inflator 78 to inflate the passenger airbag 34. In the example configuration where the extensions 38, 62 are retained by tethers 74 coupled to release pins 88, then the controller 80 instructs the release pin 88 coupling the tether 74 associated with the second extension 62 to release. In this instance, the controller 80 may not instruct the release pin 88 coupling the tether 74 to the extension 38. The main portion 36 and the second extension 62 inflate and may provide cushioning to the occupant and may prevent the occupant from sliding off of the main portion 36 and impacting the instrument panel 32 or a side door, A-pillar, and/or window.

In the example configuration where the tethers 74 are designed to break when a pressure in the inflation chamber 60 of the main portion 36 exceeds the pressure threshold, the blocks 1030 and 1040 can be combined and the blocks 1035 and 1045 may be combined. In this case, the if the impact is an impact that will move the occupant forward and to the left or is an impact that will move the occupant forward and to the right, then the controller 80 instructs the inflator 78 to operate in an inflation mode sufficient to pressurize the inflation chamber 60 above the threshold pressure to break the tethers 74 associated with the extensions 38, 62.

If the impact is not an impact that will move the occupant forward and to the left or forward and to the right, then in a block 1050 the controller 80 deploys the main portion 36 without deploying the extensions 38, 62. The controller 80 instructs the inflator 78 to inflate the passenger airbag 34. In this instance, and in the example configuration where the extensions 38, 62 are retained by the tethers 74 coupled to release pins 88, then the controller 80 does not instruct the release pins 88 to release. The main portion 36 deploys and may provide cushioning to the occupant. Alternatively, in the example configuration where the extensions are designed to break when a pressure in the inflation chamber 60 of the main portion 36 exceeds the pressure threshold, the controller 80 instructs the inflator 78 to operate in an inflation mode sufficient to pressurize the inflation chamber 60 below the threshold pressure such that the tethers 74 do not break.

Alternatively to process 1000, the vents 72 may be passive, for example, open, one-way, or two-way vents, connecting the main portion 36 to the extensions 38, 62. In the event that the vehicle 44 is involved in a frontal impact, the impact sensor 94 signals the controller 80 through the communications network 92. The controller 80 signals the inflator 78, and the inflator 78 inflates the passenger airbag 34, including the main portion 36 and the extensions 38, 62 through the vents 72 regardless of whether the frontal impact had a leftward or a rightward direction.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   an instrument panel;
   an airbag inflatable from the instrument panel to an inflated position and having a main portion and an extension extendable from the main portion in the inflated position; and
   a vent between the main portion and the extension;
   the main portion having a front panel spaced from the instrument panel in the inflated position; and
   the extension being fixed to the front panel and having an inflation chamber defined by at least the front panel.

2. The restraint system of claim 1, wherein the extension has a perimeter panel fixed to the front panel of the main portion, the inflation chamber of the extension being defined by at least the perimeter panel.

3. The restraint system of claim 2, wherein the perimeter panel extends generally perpendicularly from the front panel of the main portion when the extension is extended.

4. The restraint system of claim 2, wherein the perimeter panel extends about a perimeter of the extension and is fixed to the main portion along the perimeter.

5. The restraint system of claim 1, wherein the main portion defines an inflation chamber in communication with the inflation chamber of the extension through the front panel.

6. The restraint system of claim 1, wherein the main portion extends from the instrument panel in a vehicle-rearward direction in the inflated position, and the extension extends from the main portion in the vehicle-rearward direction in the inflated position.

7. The restraint system of claim 1, further comprising a steering wheel spaced from the airbag, the extension being disposed between the front panel and the steering wheel.

8. The restraint system of claim 1, wherein the main portion includes a side panel extending from the front panel toward the instrument panel in the inflated position, and wherein a portion of the perimeter panel of the extension extends from the side panel of the main portion when the extension is extended.

9. The restraint system of claim 1, further comprising a second extension spaced from the extension, the second extension being fixed to the front panel and having an inflation chamber defined by at least the front panel.

10. The restraint system of claim 9, wherein the front panel defines an impact surface extending between the extension and the second extension in the inflated position, the impact surface being sized to receive a head of a vehicle occupant.

11. The restraint system of claim 9, wherein the extension and the second extension are aligned along a horizontal axis in the inflated position.

12. The restraint system of claim 9, wherein the main portion includes a side panel extending about a perimeter of the front panel and extending from the front panel toward the instrument panel in the inflated position, wherein the extension and the second extension extend from the side panel of the main portion in the inflated position.

13. The restraint system of claim 1, wherein the vent is an active vent.

14. The restraint system of claim 13, further comprising a tether connected to the active vent and a release pin coupling the tether to the instrument panel.

15. The restraint system of claim 14, further comprising a controller in communication with the release pin, wherein the controller is programmed to selectively release the release pin based on a sensed direction of vehicle impact.

16. The restraint system of claim 1, further comprising a tether attached to the extension.

17. The restraint system of claim 16, further comprising a release pin coupling the tether to the instrument panel, and a controller in communication with the release pin, wherein the controller is programmed to selectively release the release pin based on a sensed direction of vehicle impact.

18. The restraint system of claim 1, further comprising a tether attached to the extension and coupled to the instrument panel, wherein the tether is designed to break when a pressure in the main portion exceeds a pressure threshold.

19. The restraint system of claim 1, further comprising an inflator in communication with the airbag and a controller in communication with the inflator, wherein the controller is programmed to instruct the inflator to inflate at a selected pressure based on a sensed direction of impact.

20. A restraint system comprising:
    an instrument panel;
    an airbag inflatable from the instrument panel to an inflated position and having a main portion and an extension extendable from the main portion in the inflated position; and
    a second extension spaced from the extension;
    the main portion having a front panel spaced from the instrument panel in the inflated position; and
    the extension being fixed to the front panel and having an inflation chamber defined by at least the front panel; and the second extension being fixed to the front panel and having an inflation chamber defined by at least the front panel.

21. A restraint system comprising:
an instrument panel;
an airbag inflatable from the instrument panel to an inflated position and having a main portion and an extension extendable from the main portion in the inflated position; and
a tether attached to the extension;
the main portion having a front panel spaced from the instrument panel in the inflated position; and
the extension being fixed to the front panel and having an inflation chamber defined by at least the front panel.

22. A restraint system comprising:
an instrument panel;
an airbag inflatable from the instrument panel to an inflated position and having a main portion and an extension extendable from the main portion in the inflated position; and
a tether attached to the extension and coupled to the instrument panel;
the main portion having a front panel spaced from the instrument panel in the inflated position;
the extension being fixed to the front panel and having an inflation chamber defined by at least the front panel; and
wherein the tether is designed to break when a pressure in the main portion exceeds a pressure threshold.

23. A restraint system comprising:
an instrument panel;
an airbag inflatable from the instrument panel to an inflated position and having a main portion and an extension extendable from the main portion in the inflated position;
an inflator in communication with the airbag; and
a controller in communication with the inflator;
the main portion having a front panel spaced from the instrument panel in the inflated position;
the extension being fixed to the front panel and having an inflation chamber defined by at least the front panel; and
wherein the controller is programmed to instruct the inflator to inflate at a selected pressure based on a sensed direction of impact.

* * * * *